United States Patent [19]
Sutton et al.

[11] 3,887,707
[45] June 3, 1975

[54] ANTI-ARTHRITIC COMPOSITIONS COMPRISING AN S-PHOSPHINE OR PHOSPHITE GOLD THIO-CYANATE AND METHODS OF PRODUCING ANTI-ARTHRITIC ACTIVITY

[75] Inventors: Blaine M. Sutton, Hatboro; Donald T. Walz, Drexel Hill; Joseph Weinstock, Phoenixville, all of Pa.

[73] Assignee: SmithKline Corporation, Philadelphia, Pa.

[22] Filed: July 23, 1973

[21] Appl. No.: 381,831

[52] U.S. Cl. .............................................. 424/210
[51] Int. Cl............................................ A61k 27/00
[58] Field of Search ............ 260/430; 424/223, 210

[56] References Cited
UNITED STATES PATENTS

| | | | |
|---|---|---|---|
| 3,635,945 | 1/1972 | Nemeth et al. | 260/430 |
| 3,676,554 | 7/1972 | McGusty et al. | 260/430 |
| 3,718,679 | 2/1973 | McGusty et al. | 260/430 |
| 3,718,680 | 2/1973 | McGusty et al. | 260/430 |

OTHER PUBLICATIONS

Australian J. Chem., 19, pp. 539–545, (1966).

*Primary Examiner*—Stanley J. Friedman
*Attorney, Agent, or Firm*—Richard D. Foggio; William H. Edgerton

[57] ABSTRACT

A pharmaceutical composition having anti-arthritic activity is comprised of an S-phosphine or phosphite gold thiocyanate. Anti-arthritic activity is produced by administering internally, preferably orally, said composition.

8 Claims, No Drawings

ANTI-ARTHRITIC COMPOSITIONS COMPRISING AN S-PHOSPHINE OR PHOSPHITE GOLD THIO-CYANATE AND METHODS OF PRODUCING ANTI-ARTHRITIC ACTIVITY

This invention relates to novel pharmaceutical compositions having anti-arthritic activity and to methods of producing anti-arthritic activity by administering said compositions. More specifically, the compositions of this invention comprise an S-phosphine or phosphite gold thiocyanate as the active medicament.

The novel pharmaceutical compositions of this invention, in dosage unit form, comprise a nontoxic pharmaceutical carrier and an S-phosphine or phosphite gold thiocyanate represented by the following structural formula:

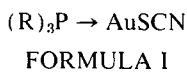

FORMULA I in which R is lower alkyl, lower alkoxy, phenyl or phenoxy, each alkyl or alkoxy having from 1 to 3 carbon atoms. Preferred are those compounds of Formula I in which R is lower alkyl.

Some gold salts are known to have anti-arthritic activity. However, their utility is limited by the requirement that they be administered only by the parenteral route. The compositions of this invention have the distinct advantage in that they are active when administered by the oral route.

The compounds of Formula I are either known or are prepared by methods known in the literature, for example, by reaction of a phosphine or phosphite gold halide, preferably chloride, with sodium thiocyanate in aqueous medium at temperatures of about 25°. Reference may be made to *Australian J. Chem.* 19:539 (1966).

The phosphine or phosphite gold halides employed as starting materials are prepared by reaction of a cold (−10° to −5°) solution of gold(I) chloride, obtained from mixing thiodiglycol and gold acid chloride trihydrate in aqueous alcohol, with an appropriate phosphine or phosphite. Other procedures which may be applied to the preparation of these intermediates are found in *J. Chem. Soc.* 1828 (1937) and 1235 (1940) and *Australian J. Chem.* 19:547 (1966).

The anti-arthritic activity of the compositions of this invention is measured by the ability of the active medicament to inhibit adjuvant-induced polyarthritis in rats. The active medicaments of Formula I produce marked inhibition of the development of adjuvant arthritis in rats at daily oral doses as low as 20 mg. (calculated on gold content) per kilogram of body weight. Adjuvant arthritis in rats is produced by a single injection of 0.75 mg. of *Mycobacterium butyricum* suspended in white paraffin (N.F.) into a hindpaw (left footpad). The injected paw becomes inflamed and reaches a maximum volume in 3 to 5 days (primary lesion). The animals exhibit a decrease in body weight gain during this initial period. Adjuvant arthritis (secondary phase) occurs after a delay of approximately ten days and is characterized by inflammation of the non-injected sites (right hind leg), decrease in body weight gain and further increases in the volume of the injected hind leg. The compounds of Formula I administered in the dose described above beginning on the day of adjuvant injection and continuing for 17 days thereafter, exclusive of days 4, 5, 11 and 12, protect the animals against development of both primary and secondary lesions of adjuvant arthritis.

The pharmaceutical compositions of this invention are prepared in conventional dosage unit forms by incorporating an amount of a compound of Formula I sufficient to produce anti-arthritic activity, without toxic effects, with a nontoxic pharmaceutical carrier according to accepted procedures. Preferably the compositions will contain as S-phosphine or phosphite gold thiocyanate of Formula I in an amount of from about 0.5 mg. to about 5 mg., calculated on gold content, per dosage unit.

The pharmaceutical carrier employed may be, for example, either a solid or liquid. Exemplary of solid carriers are lactose, terra alba, sucrose, talc, gelatin, agar, pectin, acacia, magnesium stearate, stearic acid and the like. Exemplary of liquid carriers are syrup, peanut oil, olive oil, water and the like. Similarly the carrier or diluent may include any time delay material well known to the art, such as glyceryl monostearate or glyceryl distearate alone or with a wax.

A wide variety of pharmaceutical forms can be employed. Thus, if a solid carrier is used the preparation can be tableted, placed in a hard gelatin capsule in powder or pellet form or in the form of a troche or lozenge. The amount of solid carrier will vary widely but preferably will be from about 25 mg. to about 1 g. If a liquid carrier is used, the preparation will be in the form of a syrup, emulsion, soft gelatin capsule, sterile injectable liquid such as an ampule or nonaqueous liquid suspension.

The pharmaceutical dosage unit forms described hereinabove exclude simple non-sterile solutions of the active medicament in water or in common organic solvents and exclude simple aqueous suspensions of the active medicament in the absence of a suspending agent.

The method in accordance with this invention comprises administering internally to an animal organism an S-phosphine or phosphite gold thiocyanate of Formula I, usually combined with a pharmaceutical carrier, in an amount sufficient to produce anti-arthritic activity without toxic effects. The active medicament will be administered in a dosage unit, preferably in an amount of from about 0.5 mg. to about 5 mg., calculated on gold content. The route of administration may be orally or parenterally, the oral route being preferred. Advantageously equal doses will be administered one or two times daily with the daily dosage regimen being from about 0.5 to about 5 mg., calculated on gold content. When the method described above is carried out anti-arthritic activity is produced with a minimum of side effects.

The pharmaceutical preparations are made following the conventional techniques of the pharmaceutical chemist involving mixing, granulating and compressing when necessary, or variously mixing and dissolving the ingredients as appropriate to the desired end product.

The following examples illustrate the preparation of compounds of Formula I and their incorporation into pharmaceutical compositions of this invention and as such are not to be construed as limiting the invention as set forth in the claims appended hereto. Temperatures are in degrees Centigrade unless otherwise stated.

EXAMPLE 1

S-Triethylphosphine(thiocyanato)gold

A solution of 10.0 g. (0.08 mol.) of thiodiglycol in 25 ml. of ethanol was mixed with a solution of 15.76 g. (0.04 mol.) of gold acid chloride trihydrate in 75 ml. of distilled water. When the bright orange-yellow solution was almost colorless, it was cooled to below −5° and an equally cold solution of 5.0 g. (0.0425 mol.) of triethylphosphine in 25 ml. of ethanol was added dropwise to the stirred solution. After the addition was complete, the cooled mixture was stirred for 30 minutes. The solid that separated was removed by filtration and the filtrate was concentrated to about 30 ml. to yield a second crystal crop. The combined solid was washed with 2:1 aqueous ethanol and recrystallized from ethanol by addition of water to the cloud point to give triethylphosphinegold(I) chloride, m.p. 85°-86°.

A solution of 0.82 g. (0.010 mol.) of sodium thiocyanate in 20 ml. of water was shaken with 1.75 g. (0.005 mol.) of triethylphosphinegold(I) chloride. The initial solid was replaced in 2 to 3 minutes by a light pink oil which was extracted with 20 ml. of chloroform. The extract was dried ($MgSO_4$) and evaporated to dryness to give a white oily residue which crystallized upon cooling over dry ice. The solid product was washed with ether and recrystallized from ethanol-water to give the title compound, m.p. 49.5°-50°.

EXAMPLE 2

S-Triisopropylphosphine(thiocyanato)gold

A mixture of 11.82 g. (0.03 mol.) of gold acid chloride trihydrate and 7.9 g. (0.065 mol.) of thiodiglycol in 100 ml. of aqueous ethanol (3:2) was stirred until the color of auric gold disappeared. The almost colorless solution was cooled below −5° and an equally cold solution of 5.6 g (0.035 mol.) of triisopropylphosphine in 20 ml. of ethanol was added dropwise. The volume of the final reaction mixture was increased to 250 ml. with 1:1 aqueous ethanol in order to maintain a fluid mixture. After addition the mixture was stirred in the cold for 45 minutes. The solid was removed by filtration, washed with 1:2 alcohol-water and water and dried ($MgSO_4$), then redissolved by suspension in ethanol and addition of sufficient methylene chloride to attain solution. The cloudy solution was filtered from suspended gold and the filtrate was concentrated to give triisopropylphosphinegold(I) chloride as white crystals, m.p. 184°-186°.

When an equivalent amount of triisopropylphosphinegold(L) chloride is substituted in the procedure of Example 1 for triethylphosphinegold(I) chloride, the title compound is obtained.

EXAMPLE 3

S-Trimethylphosphine(thiocyanato)gold

A solution of 2.44 g. (0.02 mol.) of thiodiglycol in 15 ml. of methanol was mixed with a solution of 3.98 g. (0.01 mol.) of gold acid chloride trihydrate in 25 ml. of distilled water. When the orange-yellow solution became almost colorless, it was cooled to −15° and an equally cold solution of methanol was added dropwise to the stirred solution. After addition, the cooled mixture was stirred for 30 minutes, then the product was filtered off and the filtrate was concentrated in vacuo to give a second crystal crop. The combined solid material was washed with cold aqueous methanol (2:1) and water to give trimethylphosphinegold(I) chloride, m.p. 228°-229°.

Substitution of an equivalent amount of trimethylphosphinegold(I) chloride in the procedure of Example 1 for triethylphosphinegold(I) chloride gives the title compound.

EXAMPLE 4

S-Triphenylphosphine(thiocyanato) gold ethanol

Gold acid chloride trihydrate (4.0 g.; 0.01 mol.) was reduced to aurous chloride with 2.44 g. of thiodiglycol in 1:2 aqueous ethanol. After cooling the solution in an ice bath, a cold solution of 2.26 g. (0.01 mol.) of triphenylphosphine in a minimum amount of ethanol was added with stirring. The reaction mixture was stirred for 30 minutes, then it was filtered and the solid product was washed with cold aqueous alcohol and ice water and dried to give triphenylphosphinegold(I) chloride, m.p. 242°-243°.

When an equivalent amount of triphenylphosphinegold(I) chloride is substituted in the procedure of Example 1 for triethylphosphinegold(I) chloride, the title compound is obtained.

EXAMPLE 5

By following procedures outlined in *J. Chem. Soc.* 1828 (1937) trialkylphosphinegold(I) iodide complexes are prepared, for example triethylphosphinegold(I) iodide. When these trialkylphosphinegold(I) iodides are substituted in the procedures of the above examples for trialkylphosphinegold(I) chlorides, the corresponding S-trialkylphosphine(thiocyanato)-gold complexes are formed.

Similarly, by following procedures outlined in *J. Chem. Soc.* 1235 (1940) trialkylphosphinegold(L) bromides are prepared, for example triethylphosphinegold(I) bromide and trimethylphosphinegold(I) bromide. Substitution of these trialkylphosphinegold(I) bromides in the procedures of the above examples for the corresponding trialkylphosphinegold(I) chlorides gives the appropriate S-trialkylphosphine(thiocyanato)-gold complexes.

EXAMPLE 6

S-Triethylphosphite(thiocyanato)gold

Gold acid chloride trihydrate (5.9 g.; 0.015 mol.) is reduced to aurous chloride with 3.7 g. (0.03 mol.) of thiodiglycol in 1:2 aqueous ethanol. The solution is cooled to −10° and an equally cold solution of 3.72 g. (0.02 mol.) of triethylphosphite in 20 ml. of ethanol is added dropwise with stirring. The temperature is maintained at −10° and stirring is continued for 30 minutes. The ethanol is removed from the reaction mixture under reduced pressure without heating and the aqueous residue is then extracted with methylene chloride. The extract is dried and the solvent evaporated in vacuo. The crude product is purified by chromatography on a silica column to give triethylphosphitegold(I) chloride as an oil.

When an equivalent amount of triethylphosphitegold(I) chloride is substituted in the procedure of Example 1 for triethylphosphinegold(I) chloride, the title compound is obtained.

EXAMPLE 7

S-trimethylphosphite(thiocyanato)gold

Gold acid chloride trihydrate (4.0 g.; 0.01 mol.) was reduced to aurous chloride with 2.44 g. of thiodiglycol in 1:2 aqueous methanol. The solution was cooled in an ice bath and a cold solution of 1.5 g. of trimethylphosphite in 10 ml. of methanol was added dropwise with stirring under nitrogen. The reaction mixture was stirred for 30 minutes, filtered and the solid was washed with cold aqueous methanol and dried. The product was dissolved in 5 ml. of chloroform and this solution was diluted with 10 ml. of methanol and filtered through charcoal. The filtrate was concentrated under reduced pressure and the residue was cooled and diluted with ice-water to precipitate trimethylphosphitegold(I) chloride, m.p. 99°–100°.

When an equivalent amount of trimethylphosphitegold(I) chloride is substituted in the procedure of Example 1 for triethylphosphinegold(I) chloride, the title compound is obtained.

EXAMPLE 8

S-Triphenylphosphite(thiocyanato)gold

When an equivalent amount of triphenylphosphite is substituted in the procedure of Example 7, triphenylphosphitegold(I) chloride is obtained.

Substitution of an equivalent amount of triphenylphosphitegold(I) chloride in the procedure of Example 1 for triethylphosphinegold(I) chloride gives the title compound.

EXAMPLE 9

| Ingredients | Mg./Tablet |
| --- | --- |
| S-Triethylphosphine(thiocyanato)gold | 0.5 |
| Calcium sulfate, dihydrate | 150 |
| Sucrose | 25 |
| Starch | 15 |
| Talc | 5 |
| Stearic acid | 3 |

The sucrose, calcium sulfate and S-triethylphosphine(thiocyanato)gold are thoroughly mixed and granulated with hot 10% gelatin solution. The wetted mass is passed through a number 6 mesh screen directly onto drying trays. The granules are dried at 120°F. and passed through a number 20 mesh screen, mixed with the starch, talc and stearic acid and compressed into tablets.

In like manner, the other S-phosphine or phosphite gold thiocyanate complexes disclosed herein may be formulated into tablets.

EXAMPLE 10

| Ingredients | Mg./Capsule |
| --- | --- |
| S-Triethylphosphine(thiocyanato)gold | 5 |
| Magnesium stearate | 5 |
| Lactose | 400 |

The above ingredients are screened through a number 40 mesh screen, mixed and filled into number 0 hard gelatin capsules.

Similarly, the other S-phosphine or phosphite gold thiocyanate complexes of this invention may be formulated into capsules.

What we claim is:

1. A tablet or capsule pharmaceutical composition having anti-arthritic activity, in dosage unit form for oral administration, comprising a pharmaceutical carrier and an effective, nontoxic amount of an S-phosphine or phosphite gold thiocyanate of the formula:

$$(R)_3P \rightarrow AuSCN$$

in which R is lower alkyl, lower alkoxy, phenyl or phenoxy, each alkyl or alkoxy having from 1 to 3 carbon atoms.

2. A pharmaceutical composition according to claim 1 in which R is lower alkyl.

3. A pharmaceutical composition according to claim 2 in which R is ethyl.

4. A pharmaceutical composition according to claim 1 in which the amount of the active medicament is from 0.5 to about 5 mg.

5. The method of producing anti-arthritic activity which comprises administering orally to an animal in need of said activity in an amount sufficient to produce said activity an S-phosphine or phosphite gold thiocyanate of the formula:

$$(R)_3P \rightarrow AuSCN$$

in which R is lower alkyl, lower alkoxy, phenyl or phenoxy, each alkyl or alkoxy having from 1 to 3 carbon atoms.

6. The method according to claim 5 in which R is lower alkyl.

7. The method according to claim 6 in which R is ethyl.

8. The method according to claim 5 in which the active medicament is administered in a daily dosage regimen of from about 0.5 mg. to about 5 mg., calculated on gold content.

* * * * *

UNITED STATES PATENT OFFICE
CERTIFICATE OF CORRECTION

PATENT NO. : 3,887,707
DATED : June 3, 1975
INVENTOR(S) : Blaine M. Sutton, Donald T. Walz and Joseph Weinstock It is certified that error appears in the above-identified patent and that said Letters Patent are hereby corrected as shown below:

Column 3, line 51, "phinegold(L) chloride" should read
--phinegold(I) chloride--

Column 3, line 62, insert after "of" the following:
--760 mg. (0.01 mol.) of trimethylphosphine in
10 ml. of--
(line omitted)

Column 4, line 9, delete "ethanol" from compound name

Column 4, line 37, "trialkylphosphinegold(L)" should read
--trialkylphosphinegold(I)--

Signed and Sealed this ninth Day of September 1975

[SEAL]

Attest:

RUTH C. MASON
Attesting Officer

C. MARSHALL DANN
Commissioner of Patents and Trademarks